(12) United States Patent
Burger et al.

(10) Patent No.: US 12,222,228 B2
(45) Date of Patent: Feb. 11, 2025

(54) OPTICAL ENCODER

(71) Applicant: VISHAY SEMICONDUCTOR GMBH, Heilbronn (DE)

(72) Inventors: Daniel Burger, Leingarten (DE); Sascha Kuhn, Oedheim (DE); Peter Mühleck, Offenau (DE); Christina Schaff, Schwaigern (DE)

(73) Assignee: VISHAY SEMICONDUCTOR GMBH, Heilbronn (DE)

( * ) Notice: Subject to any disclaimer, the term of this patent is extended or adjusted under 35 U.S.C. 154(b) by 646 days.

(21) Appl. No.: 17/602,077

(22) PCT Filed: Apr. 6, 2020

(86) PCT No.: PCT/EP2020/059742
§ 371 (c)(1),
(2) Date: Oct. 7, 2021

(87) PCT Pub. No.: WO2020/207959
PCT Pub. Date: Oct. 15, 2020

(65) Prior Publication Data
US 2022/0178722 A1 Jun. 9, 2022

(30) Foreign Application Priority Data
Apr. 10, 2019 (DE) .......................... 102019109469.0

(51) Int. Cl.
*G01D 5/347* (2006.01)
(52) U.S. Cl.
CPC ..... *G01D 5/34707* (2013.01); *G01D 5/34715* (2013.01); *G01D 5/3473* (2013.01); *G01D 5/34792* (2013.01)

(58) Field of Classification Search
CPC .......... G01D 5/34707; G01D 5/34715; G01D 5/3473; G01D 5/34792
(Continued)

(56) References Cited

U.S. PATENT DOCUMENTS 4,399,358 A 8/1983 Barkhardt et al.
4,658,133 A 4/1987 Nishiura
(Continued)

FOREIGN PATENT DOCUMENTS

CN 2535844 Y 2/2003
CN 1882823 A 12/2006
(Continued)

OTHER PUBLICATIONS

DE 102017102152 A1 (Year: 2017).*
(Continued)

*Primary Examiner* — William Choi
(74) *Attorney, Agent, or Firm* — Volpe Koenig

(57) ABSTRACT

An optical encoder comprises an emitter; a receiver; a reflector; and a code carrier, wherein the emitter emits electromagnetic radiation along an emission axis in the direction of the reflector and the reflector deflects the electromagnetic radiation along a reception axis in the direction of the receiver. The code carrier is movably supported and has a sequence of code sections to interrupt or to give way for the emitted electromagnetic radiation to impinge on the detector in dependence on the position of the code carrier, wherein the emission axis and the reception axis extend at an alignment angle with respect to one another that has a value in the range from 30 degrees to 150 degrees.

12 Claims, 11 Drawing Sheets

(58) Field of Classification Search
USPC .......................................................... 359/318
See application file for complete search history.

(56) References Cited

U.S. PATENT DOCUMENTS

| | | |
|---|---|---|
| 7,126,108 B2 | 10/2006 | Hin et al. |
| 7,507,950 B2 | 3/2009 | Wong et al. |
| 2004/0217269 A1 | 11/2004 | Kall et al. |
| 2006/0043271 A1 | 3/2006 | Chin et al. |
| 2007/0034786 A1 | 2/2007 | Oka et al. |
| 2010/0134790 A1 | 6/2010 | Vokinger et al. |
| 2011/0215230 A1 | 9/2011 | Bigand et al. |
| 2011/0272566 A1 | 11/2011 | Lippuner |
| 2017/0227383 A1 | 8/2017 | Tsen |
| 2018/0335320 A1 | 11/2018 | Mizutani |

FOREIGN PATENT DOCUMENTS

| | | | |
|---|---|---|---|
| CN | 102183268 A | 9/2011 | |
| CN | 206353033 U | 7/2017 | |
| CN | 108844560 A | 11/2018 | |
| CN | 108955735 A | 12/2018 | |
| DE | 102008014720 A1 | 10/2009 | |
| DE | 102012203263 A1 | 9/2013 | |
| DE | 102017102152 A1 * | 8/2017 | ......... G01D 5/34707 |
| EP | 0577088 A2 | 1/1994 | |
| EP | 1484582 | 12/2004 | |
| EP | 2213987 A1 | 8/2010 | |
| JP | 2016114404 A | 6/2016 | |
| KR | 20170104615 A * | 9/2017 | ......... G01D 5/34715 |
| TW | 201326761 A | 7/2013 | |
| TW | 201621279 A | 6/2016 | |

OTHER PUBLICATIONS

KR 20170104615 A (Year: 2017).*
Datasheet—Broadcom "AEDR-871x, 3-Channel High Resolution Reflective Incremental Encoder (Digital Outputs)," Nov. 30, 2017 (14 pages).
Datasheet—iC-Haus "iC-PX Series, Reflective Opto Encoders," 2016 (13 pages).

* cited by examiner

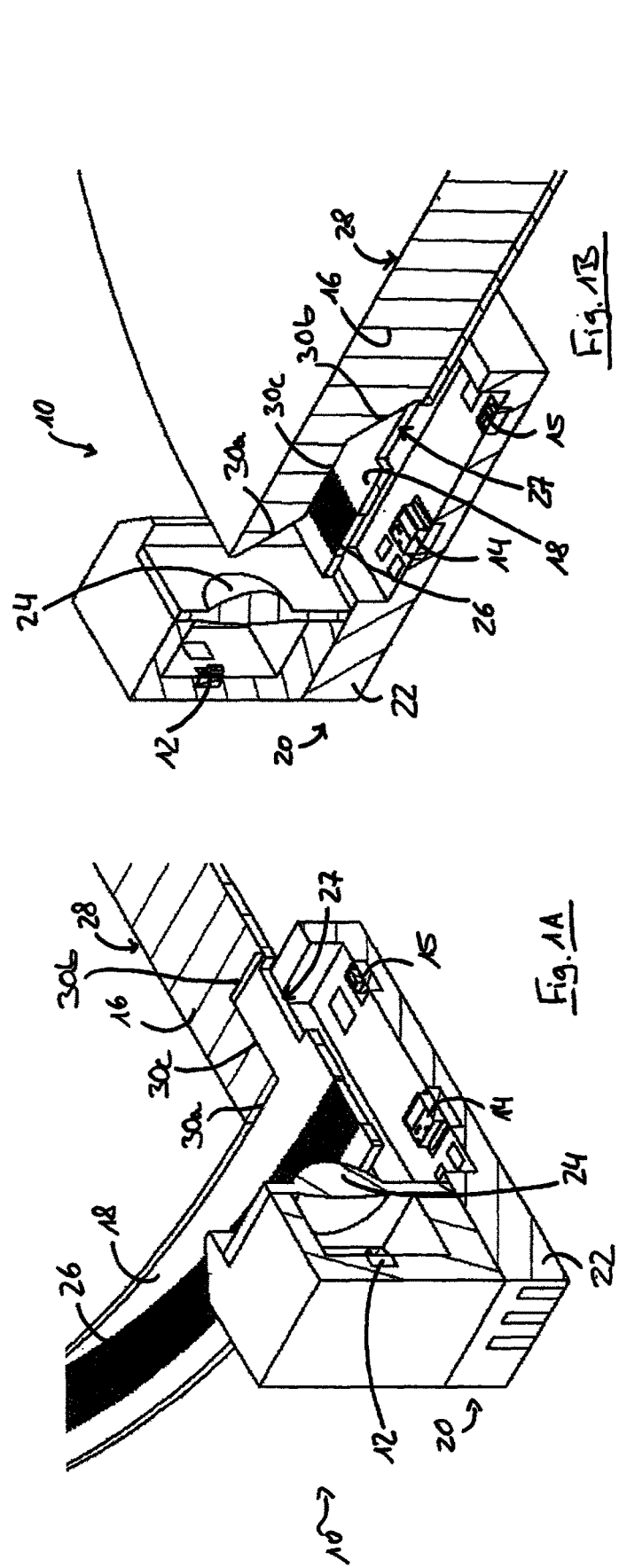
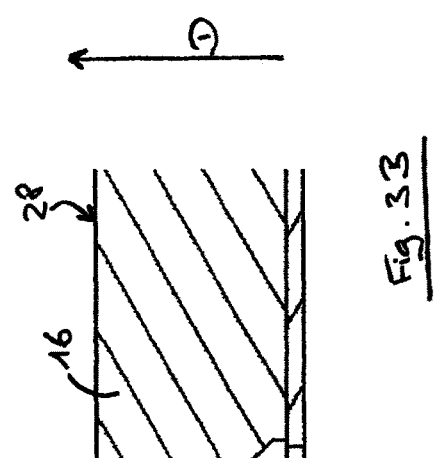
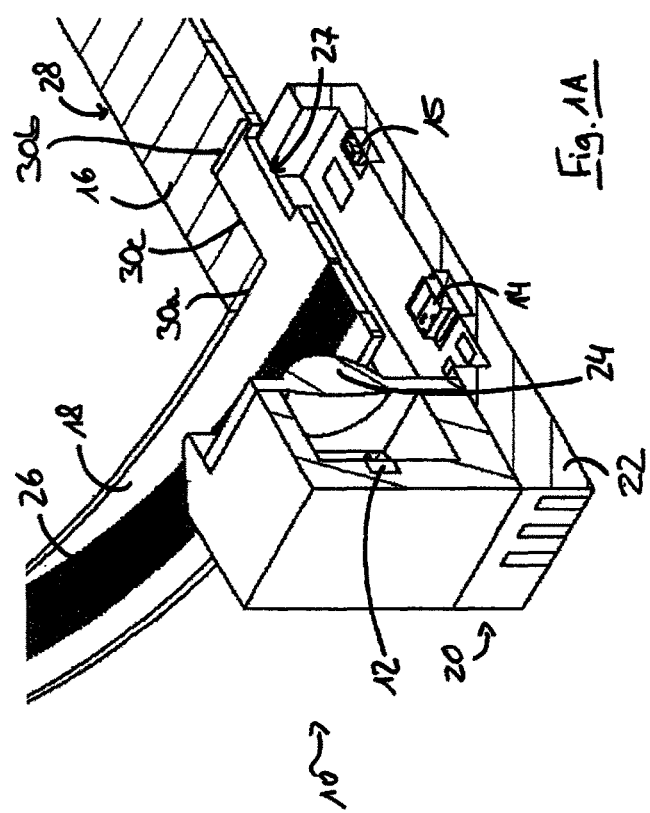
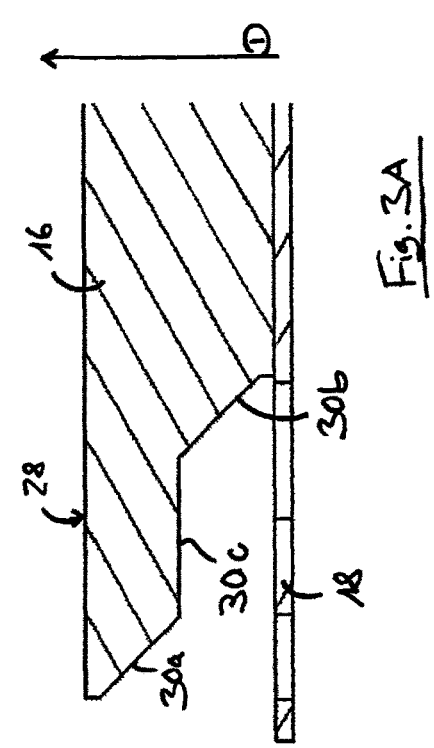

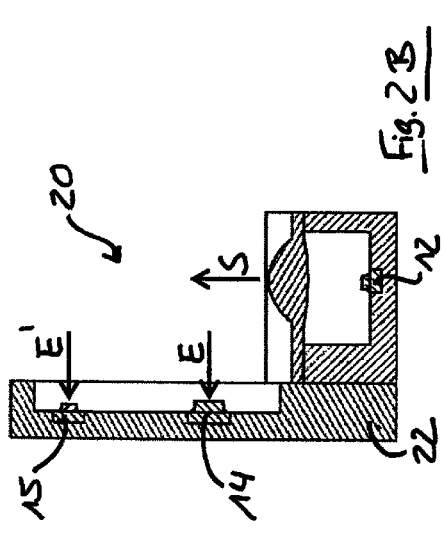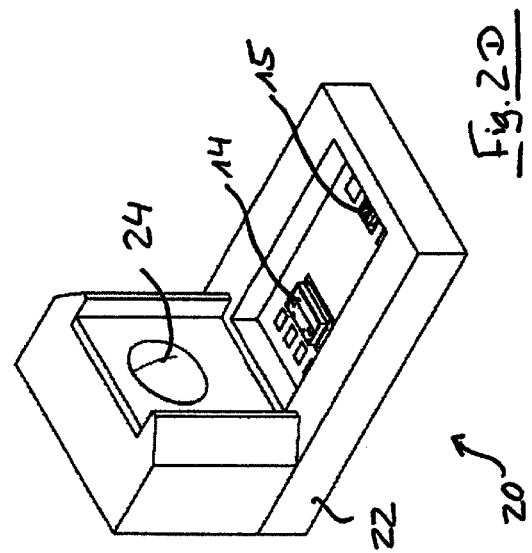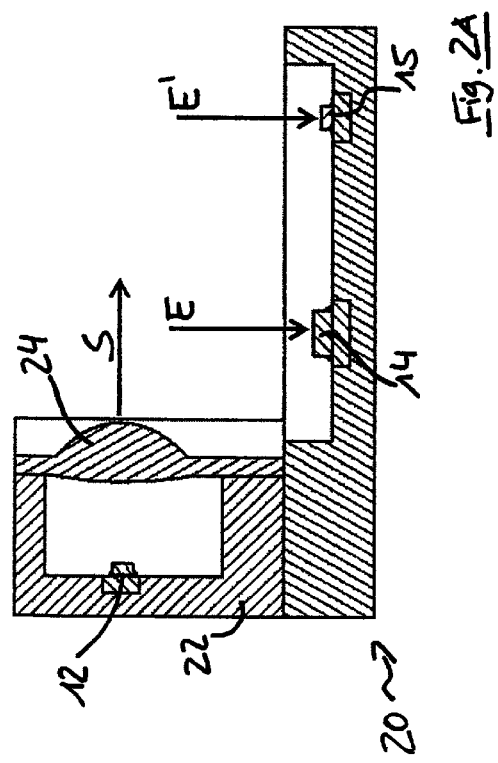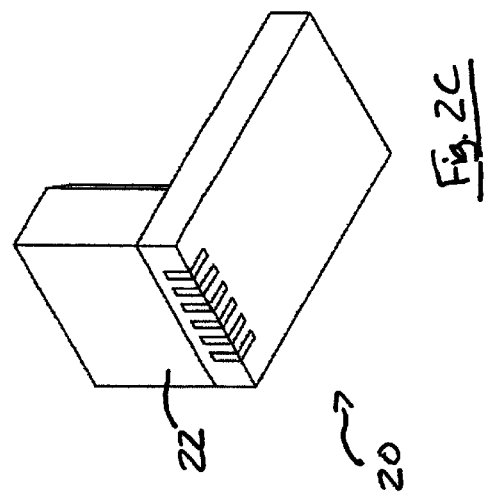

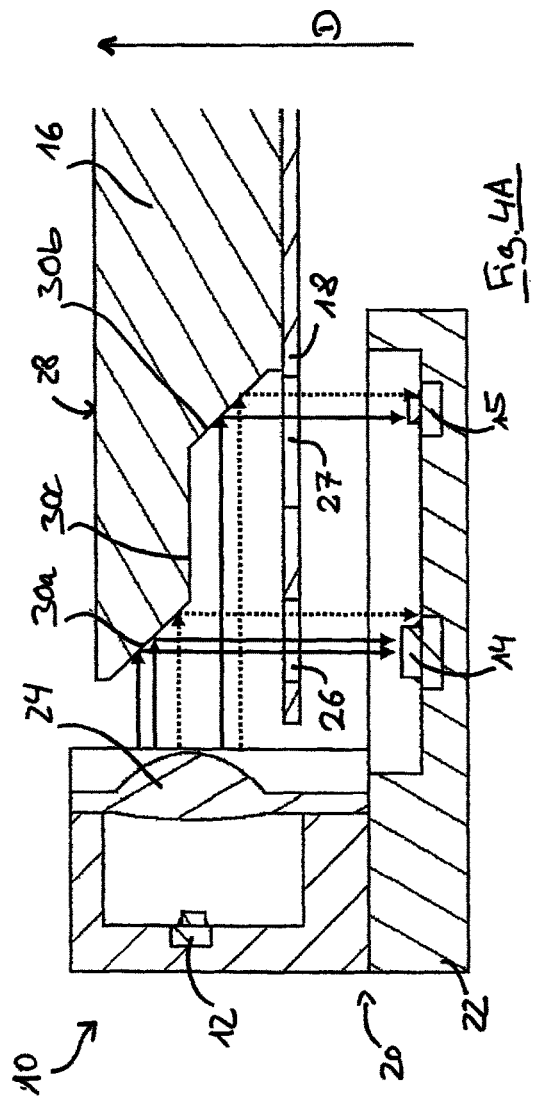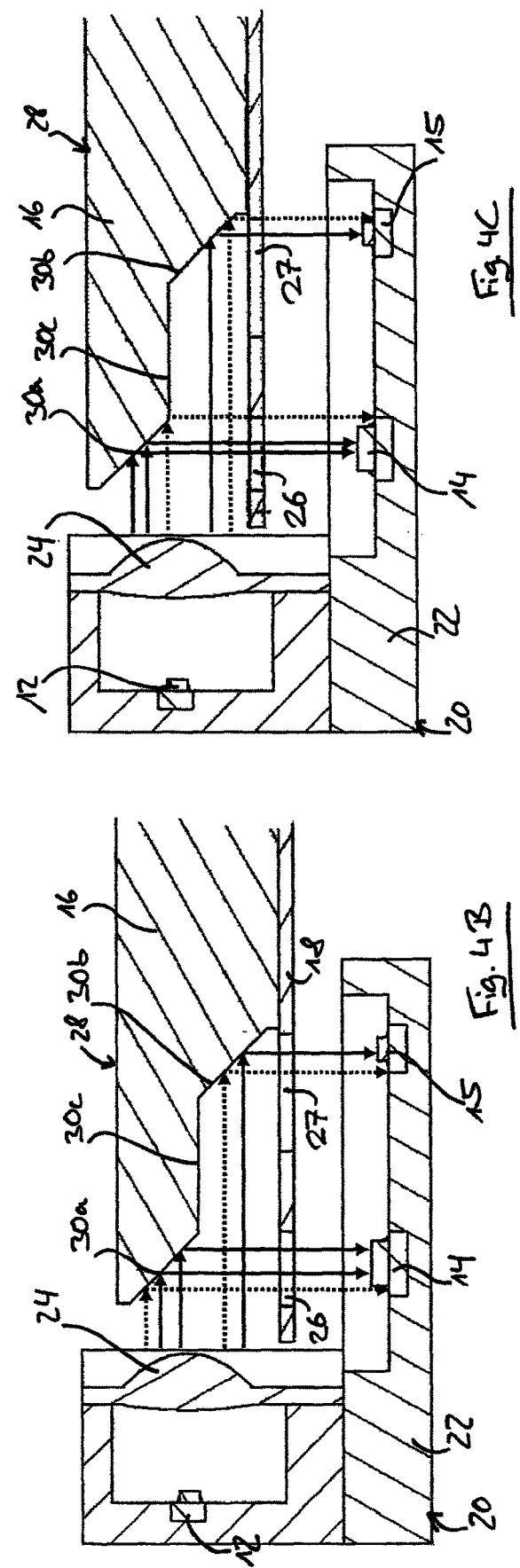
Fig. 4A
Fig. 4B
Fig. 4C

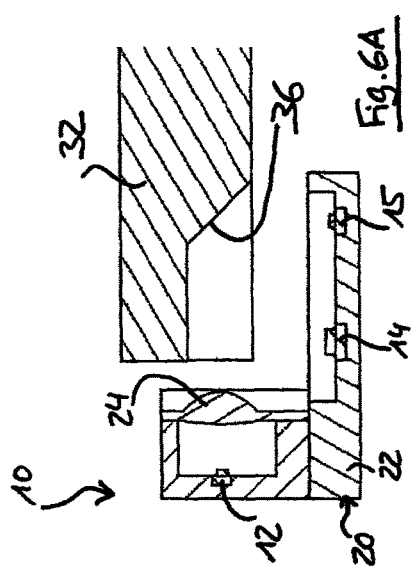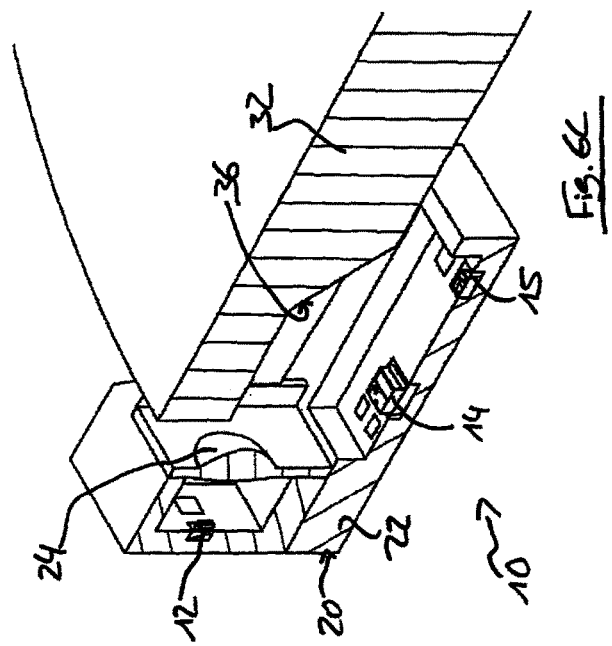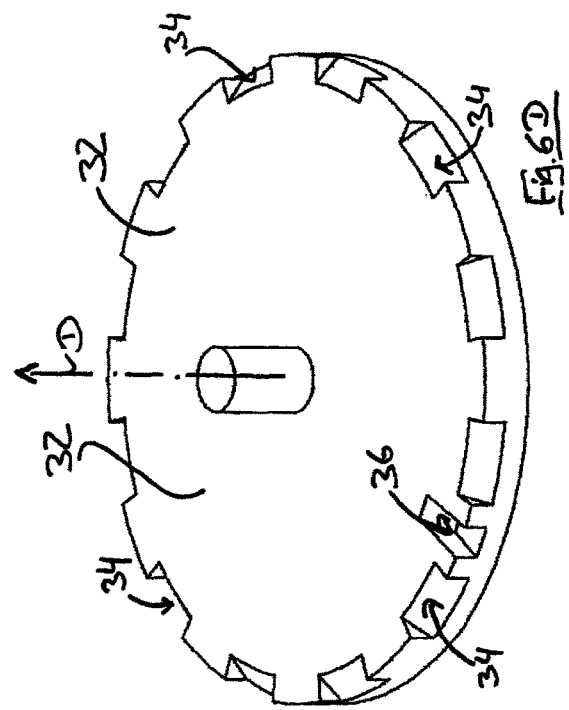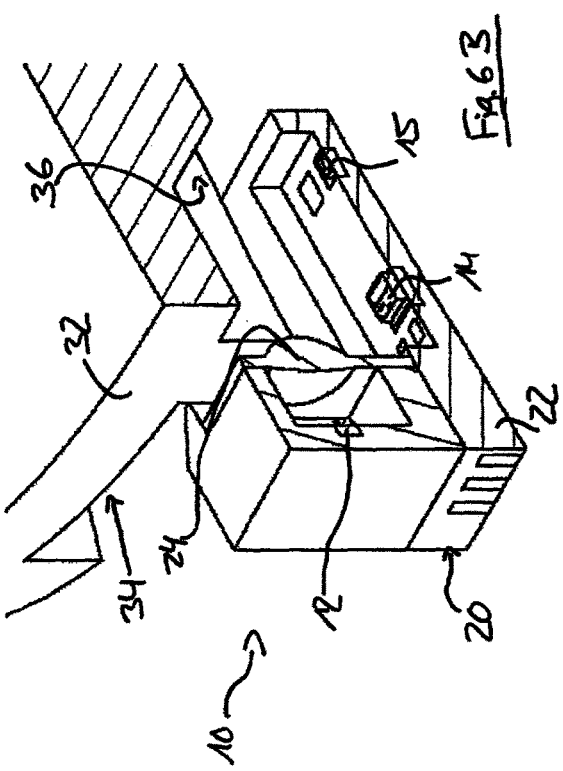

OPTICAL ENCODER

CROSS-REFERENCE TO RELATED APPLICATIONS

This application is a 371 national phase application of International Application No. PCT/EP2020/059742, filed on Apr. 6, 2020, which claims priority to German Patent Application No. 10 2019 109 469.0, filed on Apr. 10, 2019, which are both incorporated by reference as if fully set forth herein.

FIELD OF INVENTION

The present invention relates to an optical encoder comprising an emitter; a receiver; a reflector; and a code carrier, wherein the emitter emits electromagnetic radiation along an emission axis in the direction of the reflector; wherein the reflector has at least one reflection section that deflects the electromagnetic radiation along a reception axis in the direction of the receiver; and wherein the code carrier is movably supported and has a sequence of code sections that interrupt the emitted electromagnetic radiation or allow the emitted electromagnetic radiation to impinge on the receiver in dependence on the position of the code carrier.

BACKGROUND

In such an optical encoder, electromagnetic radiation that is emitted by an emitter along an emission axis is first incident onto a movable code carrier and, optionally, subsequently along a reception axis onto a receiver. The emitted electromagnetic radiation can, for example, include visible light, infrared radiation or ultraviolet radiation. The receiver is sensitive to the emitted electromagnetic radiation and converts the electromagnetic radiation received into electrical signals. The code carrier can in this respect be connected to a movable apparatus whose movement it receives. The electromagnetic radiation received at the receiver is modulated by a position change of the code carrier. This modulation of the electromagnetic radiation incident at the receiver can be evaluated with respect to a speed, a relative position change or an absolute position of the code carrier or of the apparatus connected thereto. The code carrier is in this respect frequently also designated as a timing disk or timing ruler. The optical encoder is sometimes also designated as an optical position encoder.

Known optical encoders can be divided into transmitting and reflective types that differ in the arrangement of the reflector and the design of the code carrier. In transmitting encoders, the code carrier has a sequence of radiation-transmitting and radiation-absorbing sections that, depending on the position of the code carrier, either allow the electromagnetic radiation emitted by the emitter to pass through for an impingement on the receiver or interrupt it by absorption. In contrast, the encoders of the reflective type have code carriers that have a sequence of sections reflecting electromagnetic radiation and non-reflective sections. The reflective sections of the code carrier in this respect reflect the electromagnetic radiation emitted by the emitter in the direction of the reception axis of the receiver. In contrast, electromagnetic radiation incident onto the non-reflective sections is not deflected in the direction of the reception axis of the receiver and therefore does not reach the receiver, in particular due to absorption.

It results from these two modes of operation that transmitting encoders have an arrangement of emitter and receiver in which the emission axis and the reception axis include an alignment angle of 0 degrees. For example, the emitter and receiver can be disposed opposite one another, with the code carrier being arranged in the intermediate space between the emitter and receiver. In such a configuration, the emission axis and the reception axis in particular coincide.

Reflective encoders, in contrast, have an arrangement of emitter and receiver in which the emission axis and the reception axis include an alignment angle of approximately 180 degrees. The emitter and the receiver can in this respect be arranged closely to one another in one plane and have a parallel alignment. A code carrier arranged spaced apart from the plane of the emitter and receiver can now, in dependence on its position, either reflect the electromagnetic radiation emitted by the emitter in the direction of the reception axis of the receiver (and thus allow it to impinge on the receiver) or absorb it (and thus interrupt an impingement on the receiver).

Transmitting encoders are characterized by a high degree of robustness and stability with respect to positional deviations of the emitter, receiver, or code carrier. In contrast, reflective encoders indeed have a simpler design, but have an increased proneness to disturbance or low tolerances with respect to said positional deviations. Thus, even a slight deviation from the provided arrangement plane and alignment of the code carrier can, for example, have the result that the emitted electromagnetic radiation is no longer correctly received by the receiver.

Optical encoders can generally be arranged and operated in an alignment of the emitter in which the emission axis extends in parallel with the plane of movement of the code carrier or in an alignment of the emitter in which the emission axis extends orthogonally to the plane of movement of the code carrier. In this respect, the parallel alignment offers advantages with respect to the installation, stability and robustness of the optical encoders, wherein the production can, however, be complex and/or expensive (e.g. when using a code carrier curved in a ring shape) or restrictions in the achievable resolution can result. The orthogonal alignment can enable a simpler installation of the code carrier, but with disadvantages with respect to the proneness to disturbance or installation tolerances.

It is an object of the invention to provide an improved optical encoder that is easy to install, that enables a reliable and trouble-free operation, and that makes a high resolution of the position detection possible.

SUMMARY

This object is satisfied by an optical encoder having the features of claim 1 and in particular in that the emission axis of the emitter and the reception axis of the receiver extend at an alignment angle with respect to one another that has a value in the range from 30 degrees to 150 degrees.

Since the alignment angle between the emission axis and the reception axis does not have the typical value of 0 degrees of an encoder of the transmitting type and also does not have the typical value of approximately 180 degrees of an encoder of the reflective type, the optical encoder can be flexibly arranged depending on the application, in particular with regard to the alignment of the emission axis relative to the plane of movement of the code carrier. In this respect, the emitter and receiver can be arranged at said alignment angle relative to one another on a common carrier, which enables a compact configuration and an inexpensive manufacture of the optical encoder.

The particular alignment angle between the emission axis and the reception axis also enables a simplified installation of the optical encoder in the respective application environment in many embodiments. The code carrier in particular typically has to be installed along the axis of rotation of a drive shaft or connection shaft. The relative arrangement of emitter and receiver (e.g. in a so-called L-configuration) simplifies such an axial installation of the code carrier even if the code carrier is configured as a rotatable disk.

Due to the particular relative alignment of the emitter and receiver that can be selected in a wide range, a code carrier can be used that is simple and inexpensive to manufacture. In some embodiments, the code carrier can, for example, be configured as a flat code disk that enables a high resolution (i.e. a high spatial density of code sections or a correspondingly accurate distinction of slight position changes of the code carrier). The code carrier can, for example, be configured as a thin metal disk into which a high-resolution sequence of code sections can be burned or cut, in particular by means of a laser. For example, code carriers having resolutions of 300 LPI (lines per inch) can be manufactured in this manner.

Since the code carrier in some embodiments can be configured in accordance with the principle of a transmitting encoder, a reliable and trouble-free operation of the optical encoder can be ensured. The optical encoder is thus robust with respect to any positional deviations of the emitter, receiver or code carrier with regard to alignment and relative spacings, relating to both the manufacture (installation tolerances) and operation (e.g. temperature effects). The optical encoder in particular also does not make it necessary to minimize the spacing between the code carrier and receiver as much as possible in order to obtain a signal of high resolution and high quality at the receiver, as may be necessary for a reflective encoder having a diffusely reflective code carrier Thus, the optical encoder combines a high degree of robustness and stability as well as a high resolution and a simple installation.

If an interruption of the emitted electromagnetic radiation is mentioned in connection with the invention, this refers to an interruption of the impingement on the receiver by the emitted electromagnetic radiation. Such an interruption can in particular take place by absorption of the electromagnetic radiation or also via a deflection in a direction other than that leading to the receiver.

The emitter can, for example, comprise a light emitting diode (in particular having an associated emission optics that collimates the electromagnetic radiation) or a laser diode. The receiver can comprise at least one radiation-sensitive reception element, for example a photodiode or a phototransistor, or a group or matrix of radiation-sensitive reception elements, in particular in a one-dimensional or two-dimensional arrangement (so-called array). If the receiver has a plurality of reception elements (e.g. photodiodes), they can be separate reception elements in a discrete design or a plurality of reception elements (of the same kind or configured differently with respect to one another, arranged regularly or irregularly) can be formed integrally in an assembly, for example as a so-called ASIC. The emission axis and the reception axis can in particular be perpendicular to a respective emission surface of the emitter or reception surfaces of the receiver.

In some embodiments, the emission axis and the reception axis can extend at an alignment angle with respect to one another that has a value in the range from 60 degrees to 120 degrees. Due to an alignment angle that lies in this range, a wide variety of arrangement concepts of the emitter and receiver are possible to enable an adaptation to a respective application.

In accordance with an embodiment, the alignment angle between the emission axis and the reception axis amounts to substantially 90 degrees. The electromagnetic radiation emitted by the emitter is thus deflected by the reflector by 90 degrees in the direction of the reception axis of the receiver. The emission surface of the emitter and the reception surface of the receiver can thus form two planes that include an angle of 90 degrees with one another, whereby an L-shaped configuration results for the emission surface and the reception surface. Such a configuration enables a particularly simple production and installation. In another respect, an alignment angle of 90 degrees in particular allows a particularly simple change of the optical encoder from a vertical orientation to a horizontal orientation.

In some embodiments, the code carrier is configured as a code disk (in particular as a circular disk or ring disk) that is rotatably supported about an axis of rotation and that has at least one circular ring-shaped code track, which has the sequence of code sections, at a radial spacing from the axis of rotation. In this respect, the axis of rotation, on the one hand, and the emission axis and/or the reception axis, on the other hand, can form a right angle with respect to one another. The code disk can be formed flat with respect to the axis of rotation, i.e. it can extend within a normal plane to the axis of rotation. Alternatively, the code carrier can also be configured as a linearly movable code strip that has at least one straight-line code track which has the sequence of code sections.

In some embodiments, the sequence of code sections is alternately configured as transmitting radiation or as reflective, on the one hand, and as absorbing radiation, on the other hand. Thus, when the code carrier moves, the radiation emitted by the emitter is alternately incident onto sections that give way for the emitted electromagnetic radiation to impinge on the receiver or that interrupt the emitted electromagnetic radiation. The sequence of code sections can be applied to the code carrier by various methods. Thus, the code sections can, for example, be formed by printing, etching, punching, or laser cutting.

The at least one reflection section can reflect in a specular manner to effect a defined directed reflection (in contrast to a diffuse reflector). In some embodiments, the at least one reflection section can reflect in a diffuse manner.

For example, the reflector and the at least one reflection section can be inexpensively produced from white, diffusely reflective plastic. Alternatively to this, the reflector can be inexpensively produced from plastic that is provided with a reflective surface layer to form the at least one reflection section. It is also conceivable that the reflector is produced from a transparent material and a reflection takes place at the at least one reflection section by means of total reflection.

In some embodiments, the reflector can have a single reflection section (e.g. that extends along the periphery of a rotatable disk-shaped reflector, in particular peripherally closed, or that is formed at a stationary reflector). In some embodiments, the reflector can have a plurality of reflection sections that are disposed next to one another and that form a plurality of paths or sequences (e.g. that extend next to one another along the periphery of a rotatable disk-shaped reflector). In some embodiments, the reflector can have a plurality of separate reflection sections that form a sequence (e.g. with the reflection sections forming a sequence along the periphery of a rotatable disk-shaped reflector). The sequence of a plurality of separate reflection sections can in particular correspond to a sequence of code sections that give way for the emitted electromagnetic radiation to impinge on the detector.

In some embodiments, in addition to a first sequence of a plurality of separate reflection sections, the reflector can comprise at least one further sequence of a plurality of separate reflection sections that is arranged offset from the first sequence of a plurality of separate reflection sections and that deflects the electromagnetic radiation in the direction of at least one further reception axis. In this respect, at least one further emitter can in particular be provided that emits electromagnetic radiation along at least one further emission axis. Electromagnetic radiation emitted by the at least one further emitter can then, for example, be deflected by the further sequence of a plurality of separate reflection sections in the direction of the at least one further reception axis. An increased resolution and/or an absolute position determination of the optical encoder can hereby be made possible.

In some embodiments, the reflection section(s) of the reflector is/are aligned obliquely to the emission axis and to the reception axis, in particular at a respective angle of 45 degrees. The emission axis and the reception axis can thereby in particular be arranged at an alignment angle of 90 degrees, which enables a particularly compact configuration of the optical encoder in said L configuration.

In some embodiments, the reflector and the code carrier are formed by a common assembly. Tolerances in the dimensions and in the relative spacings of the components can thereby be minimized, which increases the stability and accuracy of measurements in the operation of the optical encoder.

The reflector and the code carrier can be formed integrally in one piece with one another or the code carrier can be formed separately from the reflector, but fixedly connected to the reflector. If the code carrier and the reflector are formed separately from one another, a respective ideal material can be selected. For example, the reflector can be produced inexpensively as a mirrored plastic part, whereas the code carrier is produced as a flat metal plate to which the sequence of code sections can be attached in an inexpensive manner with a high spatial density and high accuracy.

In some embodiments, in particular if the reflector and the code carrier are formed by a common assembly, the reflector is movable. The reflector and the code carrier can, for example, move uniformly as a rigid body and can in particular move at the same speed of rotation in a rotational movement.

In some embodiments, in particular if the reflector and the code carrier are formed by a common assembly, the reflector is configured as a rotatable disk, in particular having a circular outline. The at least one reflection section of the reflector can in this respect be arranged at an obliquely inclined periphery (in particular the outer periphery) of the rotatable disk, wherein the reflection section is in particular inclined obliquely with respect to the axis of rotation of the reflector. In the case of a configuration of the code carrier as a rotatable code disk, the reflection section arranged at the oblique periphery can, for example, be aligned at an angle of 45 degrees with respect to the code disk and/or to the axis of rotation of the code disk.

In some embodiments, in particular if the reflector and the code carrier are formed by a common assembly, the at least one reflection section of the reflector is formed separately from the sequence of code sections and/or arranged spaced apart from the sequence of code sections, with the sequence of code sections being alternately configured as absorbing radiation or as transmitting radiation. For example, the code carrier can be aligned in parallel with a main plane of extent of the reflector and arranged between the at least one reflection section of the reflector, on the one hand, and the emitter or the receiver, on the other hand. In an embodiment of the reflector as a rotatable disk and the code carrier as a code disk, the reflector and the code carrier can be fixedly connected to one another (in particular axially spaced apart) and arranged in parallel with one another along a common axis of rotation. Thus, the code disk can, for example, adjoin and/or be connected to a side of the reflector corresponding to the main plane of extent.

In some embodiments, the sequence of code sections is arranged at the code carrier such that the electromagnetic radiation is incident onto the sequence of code sections in a perpendicular or substantially perpendicular manner (after the emission or after the reflection). A high resolution can hereby be achieved on a collimated emission of the electromagnetic radiation. It is, for example, conceivable that the sequence of code sections forms a circular ring that is coaxially arranged at a circular reflector and is connected thereto. The circular reflector and the (e.g. circular or circular ring-shaped) code carrier can in this respect be manufactured separately and connected to form a common assembly.

In accordance with the above explanations, the reflector can in some embodiments be configured as a rotatable (in particular circular) disk that is rotatably supported about an axis of rotation, with the at least one reflection section of the reflector being arranged at a periphery of the rotatable disk that is inclined obliquely with respect to the axis of rotation; and wherein the code carrier is configured as a (e.g. circular or circular ring-shaped) code disk that is fixedly connected to the reflector and that extends perpendicular to the axis of rotation, with the code carrier having at least one circular ring-shaped code track, which has the sequence of code sections, at a radial spacing from the axis of rotation, and with the sequence of code sections being alternately configured as absorbing radiation or as transmitting radiation.

In some embodiments, in particular in the last-mentioned embodiment (the reflector is a rotatable disk; the code carrier is a code disk connected thereto), at least one interruption section of the reflector, which is arranged adjacent to the at least one reflection section and which interrupts the electromagnetic radiation (e.g. by absorption or by a deflection that does not impinge on the receiver), can form an additional code section. In addition to the sequence of code sections of the code carrier (e.g. the code track of the code disk), at least one additional code section can hereby be formed that can, for example, serve as a so-called index generator, but is formed separately from the code carrier. Provision can in particular also be made that the sequence of code sections and the additional code section are detected by the same receiver. For this purpose, the emitter, the reflector, the code carrier, and the receiver can be arranged relative to one another in a suitable manner.

In some embodiments, the sequence of code sections is, in contrast, alternately configured as absorbing radiation or as reflective. The code carrier and the reflector can in this respect be formed by a single component, with a reflective code section forming a respective reflection section of the reflector. When the code carrier is moved, the electromagnetic radiation emitted by the emitter is then only reflected in the direction of the reception axis of the receiver if the emitted radiation is incident onto a reflective code section. For example, the sequence of alternately radiation-absorbing or reflective code sections can be formed by a corresponding design of the periphery of a circular disk-shaped reflector. This embodiment is in particular suitable for applications that only require a low resolution, but a high degree of robustness and stability. In general, one, some or all of the code sections can thus be formed by the one or a respective reflection section.

In some embodiments, in particular if the code carrier and the reflector are formed by a single component, the reflector can have a sequence of a plurality of reflection sections. In this respect, the sequence of a plurality of code sections can be formed by the sequence of a plurality of reflection sections.

In some embodiments, in particular if the code carrier and the reflector are formed by a single component, the reflector can have at least one further sequence of reflection sections in addition to a sequence of a plurality of reflection sections, wherein the further sequence of reflection sections can have a single reflection section or a plurality of reflection sections. The reflection section(s) of the further sequence can in particular serve as a so-called index generator.

In some embodiments, the reflector and the code carrier are formed by separate assemblies.

In some embodiments, in particular if the reflector and the code carrier are formed by separate assemblies, the reflector can be arranged immovably, i.e. stationary. This enables an even more robust configuration of the optical encoder. The proneness to disturbance of the optical encoder can be further reduced by minimizing the number of movable components. It is, for example, conceivable that the reflector forms an assembly that is immovably connected to the emitter and that in particular surrounds or jackets the emitter.

In some embodiments, in particular if the reflector is immovably arranged and the (e.g. circular disk-shaped) code carrier is rotatable, the code carrier can have a peripheral cutaway that is adapted to enable an installation of the code carrier which is axial with respect to the axis of rotation of the code carrier and in which the reflector or a part of the reflector is guided through the peripheral cutaway of the code carrier. In other words, the dimensions of the peripheral cutaway in a radial direction and in a peripheral direction can be selected such that the code carrier can be moved past the stationary reflector in the axial direction into the desired installation position even if the code carrier is arranged in axial alignment with the rotating code carrier in the operation of the optical encoder. The installation of the optical encoder is hereby simplified. Such a peripheral cutaway can in particular be provided for applications in which the total angular range (360 degrees) of the code carrier is anyway not required in operation (e.g. a LIDAR sensor).

In some embodiments, the code carrier has a plurality of sequences of code sections, with the plurality of sequences forming a plurality of code tracks disposed next to one another. In this respect, it is possible to provide a plurality of emitters with different emission axes that can in particular extend in parallel with one another and/or to provide a plurality of receivers with different reception axes that can likewise in particular extend in parallel with one another. As already explained, the reflector can also have a plurality of sequences of reflection sections disposed offset next to one another.

More accurate measurements can be made possible by such a multiplication of code sections. Thus, a plurality of code tracks can, for example, be used in incremental measurements to determine the direction of rotation of the code carrier or to detect passages through a specific angle of rotation of the code carrier and to determine a number of completed rotations therefrom. A plurality of code tracks that each have a plurality of code sections (in particular in different sequences) can in particular be used for a measurement of absolute position values. Alternatively to a plurality of code tracks that each have a plurality of code sections, a code track that only has a single code section (so-called index) can also be provided in addition to a code track having a sequence of a plurality of code sections.

In some embodiments, the emitter is configured to emit the electromagnetic radiation as a collimated beam. The emitter can have a laser diode, for example. In accordance with an embodiment, the optical encoder comprises a collimator (e.g. a converging lens) that is arranged between the emitter (e.g. a light emitting diode) and the reflector and that bundles the electromagnetic radiation emitted by the emitter along the emission axis and thus in particular increases the intensity of the modulated signal received at the receiver and enables a higher spatial resolution.

BRIEF DESCRIPTION OF THE DRAWINGS

The invention will be explained only by way of example in the following with reference to the Figures.

FIGS. 1A and 1B show perspective views of a section of an embodiment of an optical encoder in accordance with the invention in a vertical orientation;

FIGS. 2A to 2D show cross-sectional views (2A, 2B) and perspective views (2C and 2D) of the emission and reception apparatus 20 of the embodiment of FIG. 1;

FIG. 3A shows a cross-sectional view of a section of the reflector and code carrier of the embodiment of FIGS. 1A and 1B;

FIG. 3B shows a cross-sectional view of a section of the reflector and code carrier of a further embodiment;

FIGS. 4A to 4C show a cross-sectional view of a section of the embodiment of FIGS. 1A and 1B;

FIGS. 6A to 6C show a cross-sectional view (6A) and two perspective views (6B and 6C) of a section of a further embodiment of an optical encoder;

FIG. 6D shows the reflector of the embodiment of FIGS. 6A to 6C in a perspective bottom view;

DETAILED DESCRIPTION

Figure 5A:
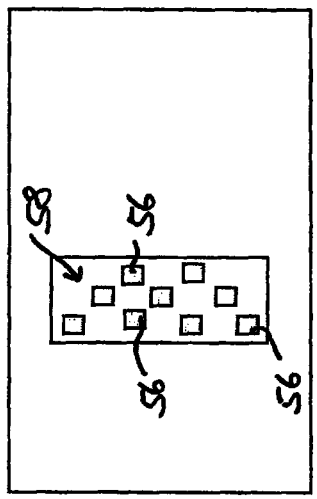
FIGS. 5A to 5D show embodiments of reception apparatus of an optical encoder in plan views.

FIGS. 1A and 1B show a radially cut section of an embodiment of an optical encoder 10 in perspective views. The optical encoder 10 comprises an emission and reception apparatus 20; a rotatable, substantially circular disk-shaped reflector 16; and a rotatable, circular disk-shaped code carrier 18. The emission and reception apparatus 20 comprises an optoelectronic emitter 12; a first optoelectronic receiver 14; and a second optoelectronic receiver 15 that are arranged on a common carrier component 22.

The emitter 12 emits electromagnetic radiation (e.g. visible light, infrared radiation or ultraviolet radiation) along an emission axis S (see FIGS. 2A and 2B), while the first receiver 14 receives electromagnetic radiation along a reception axis E (see FIGS. 2A and 2B) and the second receiver 15 receives electromagnetic radiation along a reception axis E' (see FIGS. 2A and 2B). The first receiver 14 and the second receiver 15 each have at least one reception element, in particular a photodiode or photodiode array, that is sensitive to the emitted electromagnetic radiation and can convert it into an electrical signal. In the embodiment shown, the emission axis S is aligned in parallel with the plane of extent or plane of movement of the code carrier 18.

The optical encoder 10 furthermore comprises an optical collimator 24, here in the form of a lens, that is arranged along the emission axis S and preferably close to the emitter 12 and bundles the electromagnetic radiation emitted by the emitter 12.

The code carrier 18 is configured as a thin code disk (e.g. composed of metal) that has a circular outline and a circular ring-shaped sequence of code sections 26 (also called a code track). The code sections 26 are formed by elongated slits that pass through the code disk, that extend in the radial direction and that can be formed by milling, punching, or laser cutting, for example. The sequence of code sections 26 thus alternately has a radiation-transmitting or radiation-absorbing effect for electromagnetic radiation that is incident onto the code carrier 18 or code disk in a perpendicular or substantially perpendicular manner. In addition to the sequence of code sections 26, the code carrier 18 has a second sequence of code sections 27 that is radially offset from the sequence of code sections 26. In the embodiment shown, the second sequence of code sections 27 comprises a single radiation-transmitting code element in the form of a recess that gives way for the second receiver 15 to be impinged by electromagnetic radiation.

The reflector 16 is configured as a disk that has a circular outline, that extends along a main plane of extent 28, and that is rotatably supported about an axis of rotation D (see FIGS. 3A and 3B), wherein the main plane of extent 28 adopts an angle of 90 degrees with the axis of rotation D. The reflector 16 has two continuous reflection sections 30a, 30b that are arranged at a respective periphery of the rotatable disk and that are axially and radially offset from one another with respect to the axis of rotation D. The reflection sections 30a, 30b are thus formed at chamfered regions of the outer periphery of the reflector 16 or of the rotatable disk and are arranged vertically above one another, wherein a lower reflection section 30b has a radial offset in the direction of the axis of rotation D relative to an upper reflection section 30a. Both reflection sections 30a, 30b are connected to one another by a connection section 30c that is formed horizontally here.

The reflection sections 30a, 30b are aligned obliquely to the emission axis S and to the reception axes E, E' and reflect electromagnetic radiation emitted along the emission axis S in the direction of the reception axes E and E'. In the embodiment shown, the reflection section 30a reflects electromagnetic radiation in the direction of the reception axes E of the first receiver 14, while the reflection section 30b reflects electromagnetic radiation in the direction of the reception axis E' of the second receiver 15. Furthermore, the reflection sections 30a and 30b have identical alignment angles relative to the emission axis S. In other embodiments, said alignment angles can also adopt different values, however.

The reflector 16 can be produced from an opaque plastic and can have reflection sections 30a, 30b in the form of reflective coatings. It is also conceivable that the reflector 16 is produced from a transparent plastic and totally reflects electromagnetic radiation emitted by the emitter 12 along the emission axis S in the direction of the reception axes E and E'.

FIGS. 2A to 2D show the emission and reception apparatus 20 of the embodiment of FIG. 1 in two cross-sectional views (2A and 2B) and two perspective views (2C and 2D). In the emission and reception apparatus 20, the emitter 12, on the one hand, and the first receiver 14 and the second receiver 15, on the other hand, are arranged in an L-shaped configuration on the carrier component 22 such that the respective alignment angle between the emission axis S and the reception axis E or the reception axis E' amounts to 90 degrees. The emission axis S and the reception axis E are in this respect perpendicular to respective emission and reception surfaces of the emitter 12 and of the first receiver 14 that thus include an angle of 90 degrees with one another. A corresponding relationship also applies to the emission axis S and the reception axis E' of the second receiver 15.

In the representation of FIG. 2A, the emission and reception apparatus 20 is installed in accordance with the embodiment of FIGS. 1A and 1B. In this respect, the first and second receivers 14 and 15 are horizontally disposed with the carrier component 22 on a support, not shown, whereas the fastening plane of the emitter 12 is arranged at an angle of 90 degrees to the support. FIG. 2B shows an emission and reception apparatus 20 that has an inverted orientation in which the emission axis S is oriented perpendicular to the plane of extent or plane of movement of the code carrier 18. The emitter 12, with the carrier component 22, is horizontally disposed on the support here, whereas the respective fastening plane of the first and second receivers 14 and 15 is arranged at an angle of 90 degrees to the support. The L-shaped formation of the emission and reception apparatus 20 enables a quick change between the two alignment variants and thus offers a high degree of flexibility in the application of the optical encoder 10.

In the embodiment of FIGS. 1A and 1B, the reflector 16 and the code carrier 18 form a common assembly. FIG. 3A shows a section of a common assembly comprising the reflector 16 and the code carrier 18 in a cross-sectional view. In this respect, the reflector 16 and the code carrier 18 or the code disk are arranged axially spaced apart from one another along the common axis of rotation D and are fixedly connected to one another (e.g. adhesively bonded). The direction of the axis of rotation D is indicated by an arrow. The code carrier 18 or the code disk is in particular aligned in parallel with the main plane of extent 28 of the reflector 16. The reflector 16 and the code carrier 18 thus behave as a rigid body on a rotation about the axis of rotation D and move at the same rotational speed or rotational frequency in a rotational movement about the axis of rotation D.

FIG. 3B shows a section of a common assembly of a further embodiment comprising the reflector 16 and the code carrier 18 in a cross-sectional view. In contrast to the embodiment of FIGS. 1A, 1B and 3A, the reflector 16 of FIG. 3B only has a single continuous reflection section 31 that is arranged at the periphery of the rotatable code disk having a circular outline.

FIG. 4A shows a section of a cross-sectional view of the embodiment of FIGS. 1A and 1B. The optical encoder 10 can, for example, be connected to an associated apparatus, not shown, in order to determine its movement or its movement components. The optical encoder 10 receives the movement or the movement components of the apparatus via the axis of rotation D and converts it/them into a rotation of the reflector 16 and of the code carrier 18. For this purpose, the reflector 16 and the code carrier 18 can be fixedly connected to a rotatable shaft (not shown) that can be a part of the associated apparatus and/or a part of the optical encoder 10.

Electromagnetic radiation that is emitted by the emitter 12 along the emission axis S is reflected by the reflection sections 30a, 30b of the reflector 16 in the direction of the reception axes E and E' of the first and second receivers 14 and 15. In FIG. 4A, solid arrows represent beam extents of electromagnetic radiation that is reflected in a corresponding manner by the reflection sections 30a, 30b. In contrast, interrupted arrows represent beam extents of electromagnetic radiation that is emitted and reflected such it that it does not reach the first or second receiver 14 or 15.

On the way from the emitter 12 to the first and second receivers 14 and 15, the electromagnetic radiation is incident onto the code carrier 18 that rotates about the axis of rotation D at a rotational speed provided by the movement of the associated apparatus. Due to the movement of the code carrier 18, the electromagnetic radiation is alternately incident onto radiation-transmitting and radiation-absorbing code sections 26 and 27 respectively, whereby the electromagnetic radiation received at the first and second receivers 14 and 15 is modulated. This modulation of the electromagnetic radiation incident at the first and second receivers 14 and 15 can now be evaluated with respect to a speed, a relative position change or an absolute position of the code disk 18 or of the associated apparatus.

FIG. 4B and FIG. 4C show the influence of positional deviations and tolerances in the relative spacings of the emitter 12, of the reflector 16 with the code carrier 18, and of the first and second receivers 14, 15. FIG. 4B shows a section of a cross-sectional view of the embodiment of FIG. 4A, wherein the common assembly of the reflector 16 and code carrier 18 has a reduced spacing from the emitter 12 and also from the first and second receivers 14 and 15, i.e. it is offset radially outwardly and axially downwardly in the manner of representation in accordance with FIG. 4B. In contrast, FIG. 4C shows a section of a cross-sectional view of the embodiment of FIG. 4A, wherein the common assembly of the reflector 16 and code carrier 18 has an increased spacing from the first and second receivers 14 and 15, i.e. is offset axially upwardly in the representation in accordance with FIG. 4C. As shown in FIG. 4B and FIG. 4C, these positional deviations and spacing changes, which can occur within the framework of typical tolerances in the installation and during the operation of the optical encoder 10 (for instance, due to vibrations or temperature effects), have no influence on the operability of the optical encoder 10. In the two cases shown, which deviate from nominal relative spacings, electromagnetic radiation is obtained from the reflection sections 30a, 30b and deflected in the direction of the first and second receivers 14 and 15, which, in an analog manner to FIG. 4A, is again represented by solid and interrupted arrows. In other words, the optical encoder 10 can be operated in a stable manner despite the positional deviations and spacing changes.

A particular advantage of the embodiments described is also that the code carrier 18 or the code disk can be installed in the axial direction (and thus along the associated drive shaft or connection shaft) with respect to the axis of rotation D (in the vertical direction from above in the representations shown) without the emitter 12 and the receivers 14 and 15 hindering the installation of the code carrier 18.

The embodiments described have two receivers 14 and 15. Embodiments that have only one receiver and dispense with a second receiver are also conceivable, however.

The second measurement channel provided by the second receiver 15 in the embodiments shown can, for example, be used to determine a direction of rotation. In a further application, in optical encoders 10 that work in an incremental manner, the second measurement channel can serve to detect passages through a specific angle of rotation and to determine a number of completed revolutions therefrom. With optical encoders working in an absolute manner that are used to determine an absolute value of the angle of rotation, the formation of at least one such additional measurement channel is, in contrast, absolutely necessary.

Figure 5B:
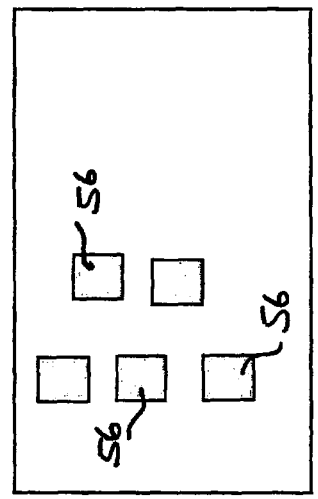
Figure 5C:
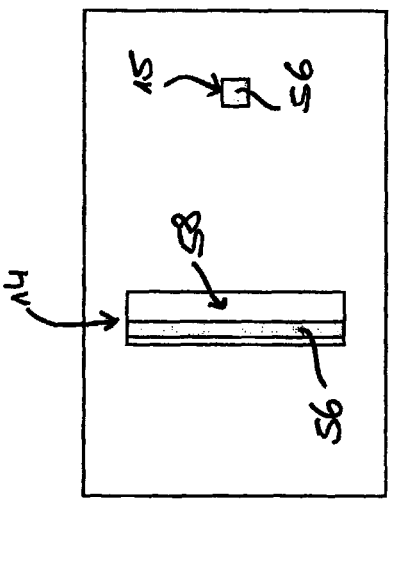
Figure 5D:
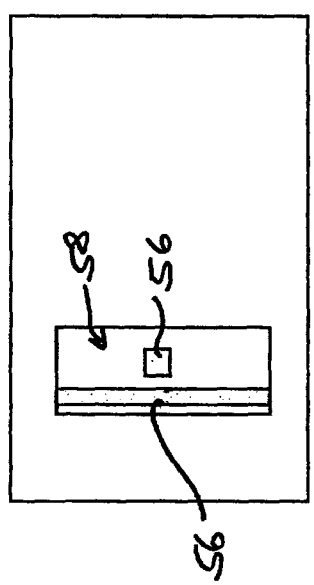

FIGS. 5A to 5C show embodiments of reception apparatus of such optical encoders 10 working in an absolute manner in plan views. In FIG. 5A, the first receiver 14 is formed by a row of reception elements 56, for example photodiodes, that are arranged in a linear matrix behind one another. The first receiver 14 is in this respect configured as an ASIC 58 (application-specific integrated circuit). The second receiver 15 is formed by a separate reception element 56, in particular a photodiode, that is arranged laterally offset from the first receiver 14 and is not integrated in the ASIC 58. In contrast, FIG. 5B shows an embodiment that is based on the embodiment of FIG. 5A, but in this respect has a second receiver 15 whose reception element 56 is integrated in the ASIC 58. FIG. 5C shows an embodiment of a reception apparatus in which reception elements 56, which can in turn be configured as photodiodes, are arranged in a two-dimensional matrix and are configured as an ASIC 58. The respective reception elements 58 in this respect correspond to different values of a binary coding, whereby the absolute value of the angle of rotation can be determined. The embodiment of FIG. 5D differs from the embodiment of FIG. 5C in that the individual reception elements 56 are not integrated in an ASIC, but are discrete and are arranged separately.

FIGS. 6A to 6C show a cross-sectional view (FIG. 6A) and two perspective views (FIGS. 6B and 6C) of a section of a further embodiment of an optical encoder 10. FIG. 6D furthermore shows the reflector 32 of the embodiment of FIGS. 6A to 6C in a perspective bottom view. In this embodiment, the reflector 32 and the code carrier 18 also form a common assembly that is rotatably supported about the axis of rotation D. The arrangement of the emitter 12, first receiver 14 and second receiver 15 corresponds to the arrangement of the embodiment of FIG. 1A (the emission axis S extends in parallel with the plane of movement of the code carrier 18, that is in the horizontal direction). In contrast to this, the embodiment of FIG. 6A, however, does not have a separately configured code carrier (e.g. code disk). Instead, the code carrier is integrated in the embodiment of the reflector 32, i.e. it is integrally formed in one piece with it.

For this purpose, the outer periphery of the substantially circular disk-shaped reflector 32 is divided into a sequence of alternately radiation-absorbing or reflective sections. The sequence of obliquely inclined reflection sections 34 hereby formed simultaneously serves as a sequence of code sections having a comparatively low resolution. On a rotational movement of the reflector 32 about the axis of rotation D, the electromagnetic radiation emitted by the emitter 12 is only reflected in the direction of the reception axis E of the first receiver 14 if it is incident onto one of the reflection sections 34 or, in other words, onto one of the reflective code sections.

The reflector 32 has a further sequence of reflection sections 36 that is arranged radially offset from the sequence of reflection sections 34 with respect to the axis of rotation of the reflector 32. In the embodiment shown, the further sequence of reflection sections 36 is formed by a single reflection section 36 that can be used as an index generator in optical encoders 10 that work in an incremental manner to determine the number of completed revolutions about the axis of rotation D, for example. However, a plurality of reflection sections 36 can also be provided, in particular at a uniform angular spacing from one another (e.g. 180 degrees, 90 degrees or 45 degrees).

Figure 7B:
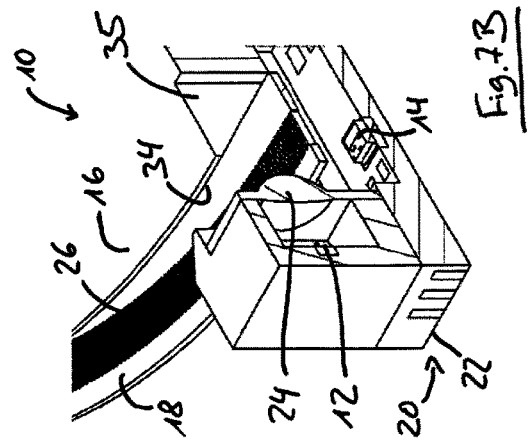
FIGS. 7A to 7E show three perspective views (7A, 7B, 7D) and two cross-sectional views (7C and 7E) of a section of a further embodiment of an optical encoder.
Figure 7C:
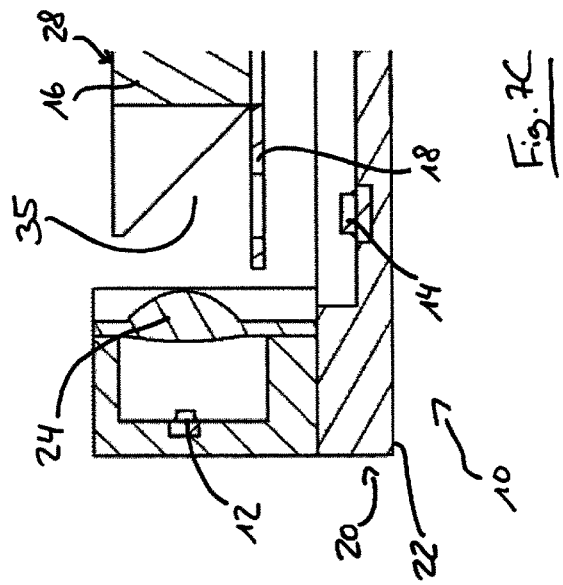
Figure 7A:
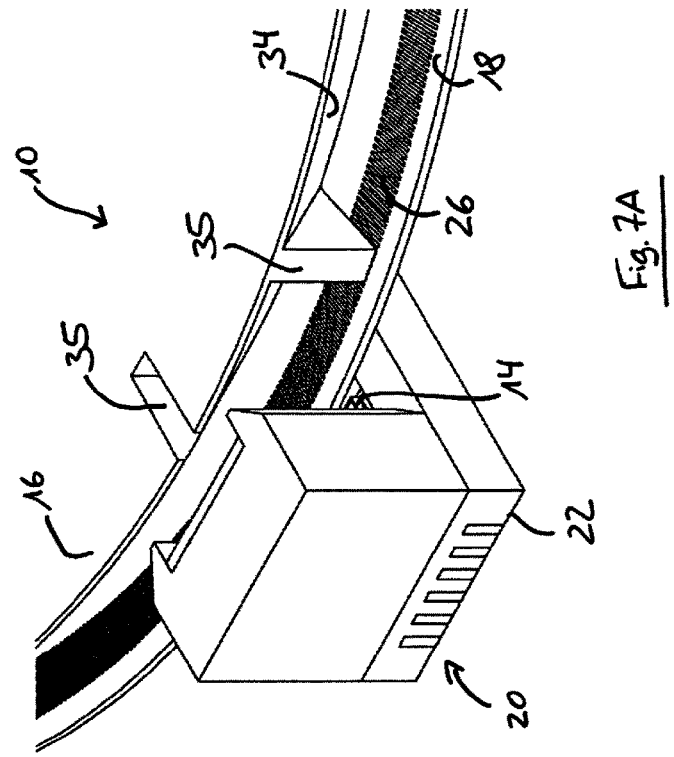
Figure 7D:
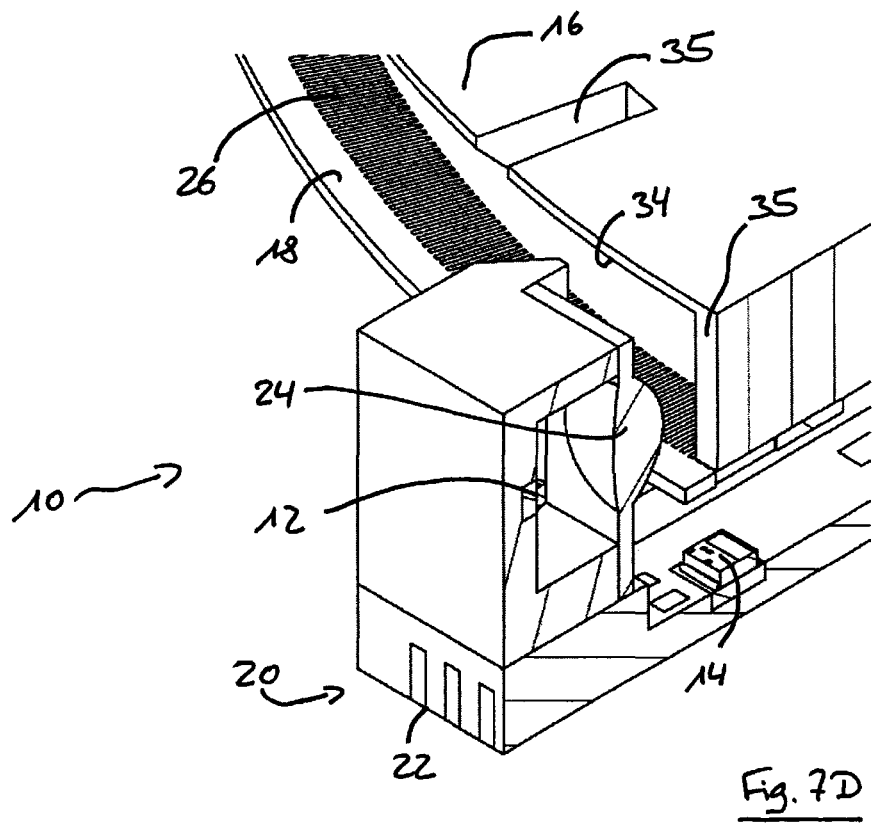
Figure 7E:
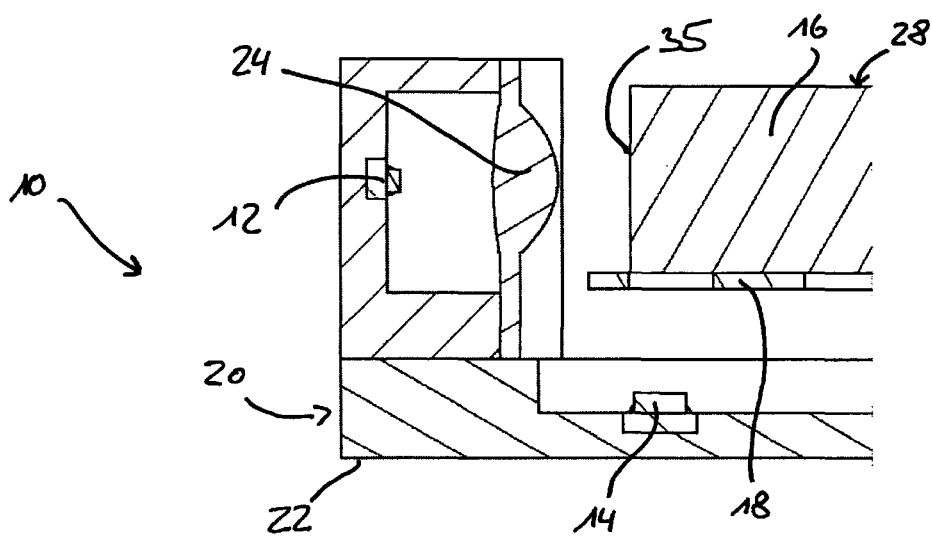

As regards FIGS. 1A to 4C and FIGS. 6A to 6D, it can also be noted that an embodiment is also possible in which only a single emission axis S and a single reception axis E are provided for a single receiver 14. Nevertheless, a so-called index signal can also be generated in such an embodiment. A section of such an embodiment of an optical encoder 10 is shown in FIGS. 7A to 7E in three perspective views and two cross-sectional views, wherein FIGS. 7A to 7C show the optical encoder 10 at a first angle of rotation of the reflector 16 and FIGS. 7D and 7E show the optical encoder 10 at a second angle of rotation of the reflector 16. The arrangement of the emitter 12, reflector 16 and code carrier 18 corresponds to the arrangement of the embodiment of FIG. 1, i.e. the reflector 16 and the code carrier 18 form a common assembly that is rotatably supported about the axis of rotation D. In the embodiment of FIG. 7, an index signal is generated in that the reflector 16 has at least one interruption section 35 in the peripheral direction adjacent to one or more reflection section(s) 34, which can in particular extend over wide peripheral regions, said interruption section 35 interrupting the electromagnetic radiation with respect to the impingement on the receiver 14 and hereby indirectly forming an additional code section that is separate and independent from the code carrier 18, however. The respective interruption section 35 can in particular extend over a (distinguishably) larger peripheral angle than the widest radiation-absorbing code section 26 of the code carrier 18. If, in contrast, a reflection section 34 reflecting the electromagnetic radiation is located in the beam path, the emitted electromagnetic radiation is deflected in the direction of the receiver 14, wherein a modulation can take place by means of the code sections 26 of the code carrier 18. A further sequence of (one or more) reflection section(s) 36 radially or axially offset with respect to the reflection sections 34 is not necessary in this embodiment.

In the embodiment shown, the reflector 16, for example, has two different interruption sections 35 (recess with a planar surface or elevation with a planar surface) that are each located in the beam path at the angles of rotation of the reflector 16 shown in FIG. 7 and that interrupt the electromagnetic radiation. In general, however, an embodiment with only a single interruption section 35 is also possible or a plurality of interruption sections 35 of the same kind can also be provided, in particular having the same width (peripheral angle) or having different widths (for mutual distinguishability). The respective interruption section 35 can cause an interruption of the impingement on the receiver 14 by the emitted electromagnetic radiation, for example by absorption of the electromagnetic radiation, or by deflection in a direction other than that leading to the receiver 14. The respective interruption section 35 can in particular be correspondingly shaped, coated, and/or surface-structured for this purpose.

If, as shown in FIGS. 7A to 7E, two interruption sections 35 are provided, the index signal can be generated particularly reliably from the known respective width (peripheral angle) of the interruption sections 35 and from the known spacing of the interruption sections 35.

Figure 8C:
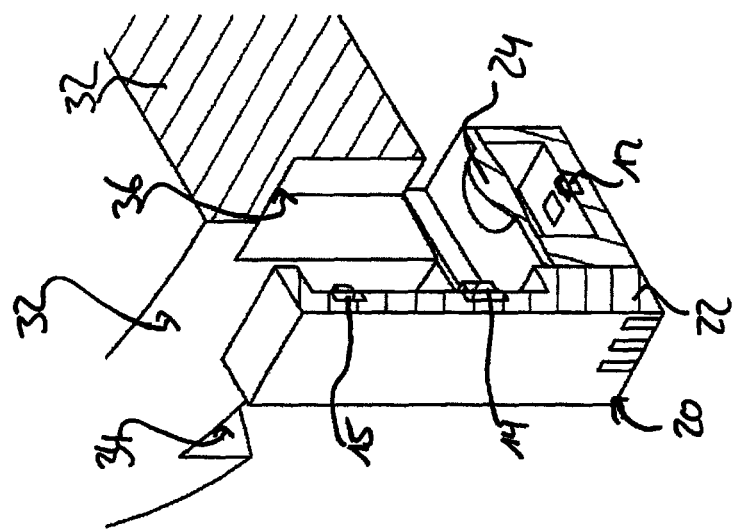
FIGS. 8A to 8F show cross-sectional views (8A and 8D) and four perspective views (8B, 8C, 8E, 8F) of a section of the embodiment of FIG. 6A.
Figure 8B:
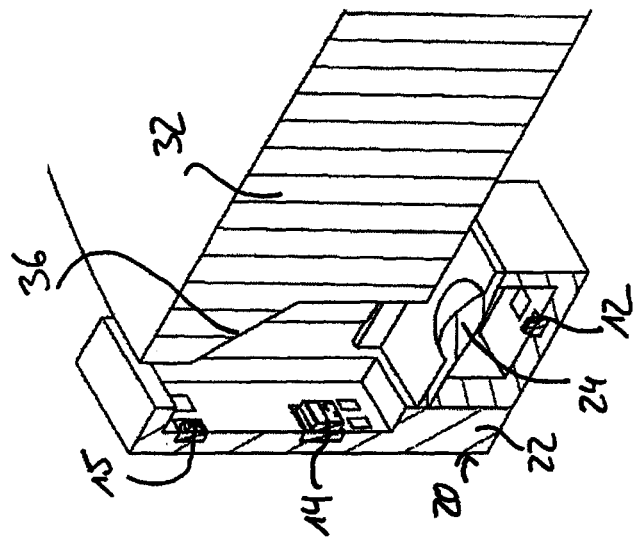
Figure 8A:
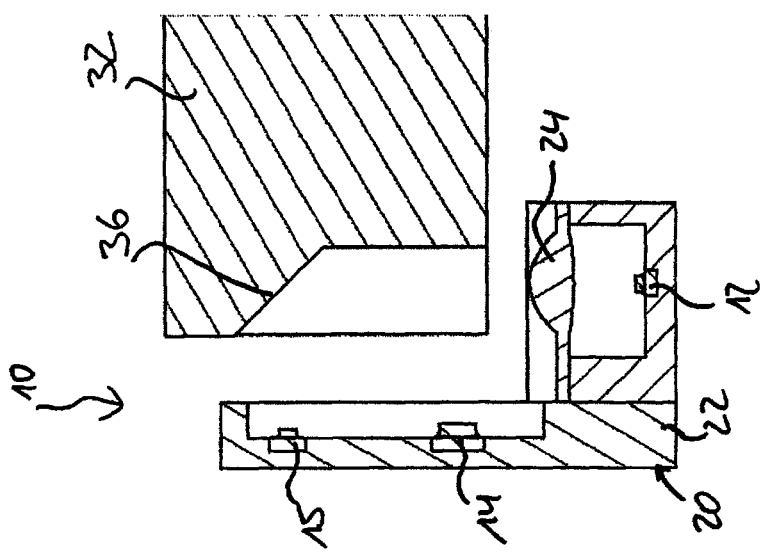
Figure 8F:
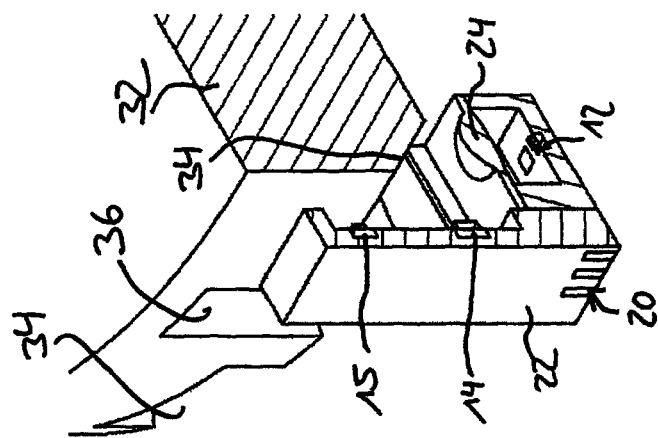
Figure 8E:
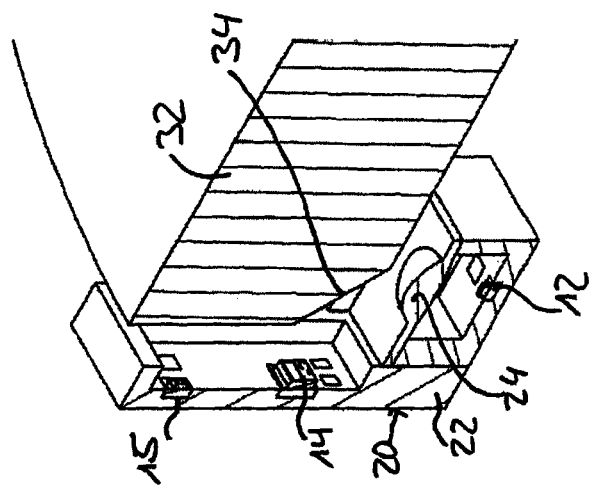
Figure 8D:
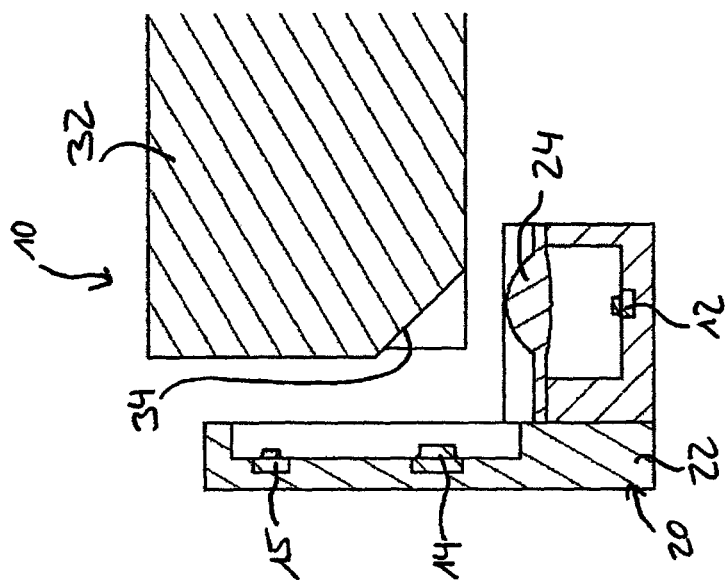

FIGS. 8A to 8F show cross-sectional views (FIGS. 8A, 8D) and four perspective views (FIGS. 8B, 8C, 8E, 8F) of a section of a version of the embodiment of FIG. 6A (the emission axis S extends orthogonally to the plane of movement of the code carrier 18, that is in the vertical direction). In this respect, FIGS. 8A to 8C and FIGS. 8D to 8F show the optical encoder 10 at two different angles of rotation of the reflector 32 that result in respective different impingements on the first and second receivers 14 and 15. The reflector 32 has a further sequence of reflection sections 36 that is arranged axially offset from the sequence of reflection sections 34 with respect to the axis of rotation of the reflector 32. Electromagnetic radiation that is incident onto the reflection section 36 is in this respect deflected in the direction of the second reception axis E' of the second receiver 15 in order to impinge on the latter and to generate a signal (FIGS. 8A to 8C). If electromagnetic radiation is, in contrast, incident onto one of the reflection sections 34, it is deflected in the direction of the reception axis E of the receiver 14 to generate a signal there (FIGS. 8D to 8F). This embodiment offers a reliable, robust and stable alternative to carry out measurements that only require a low resolution.

Figure 9A:
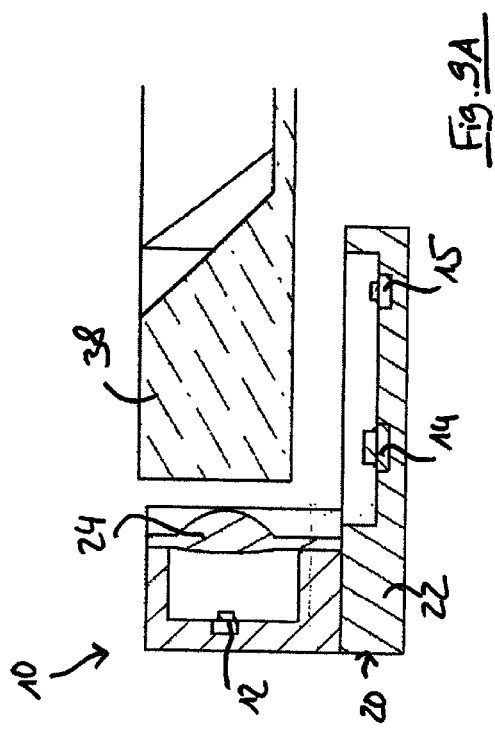
FIGS. 9A to 9C show a cross-sectional view (9A) and two perspective views (9B and 9C) of a section of a further embodiment of an optical encoder.
Figure 9B:
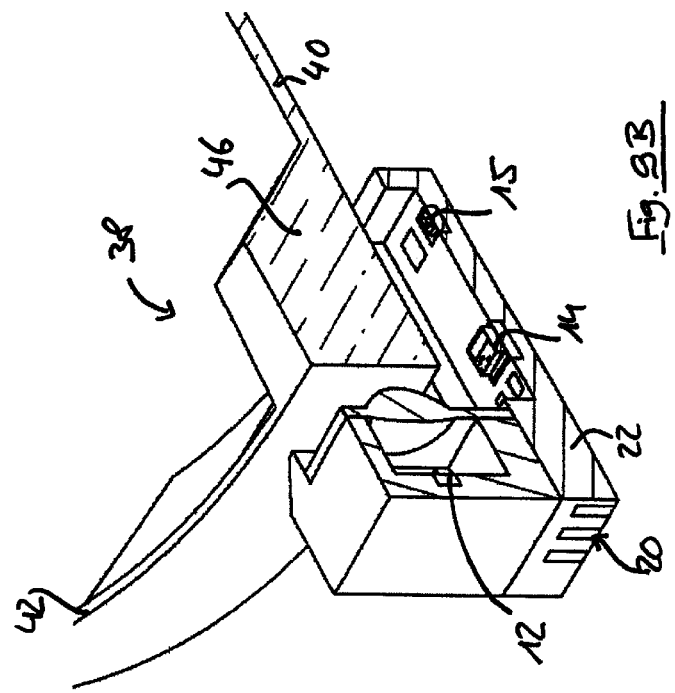
Figure 9D:
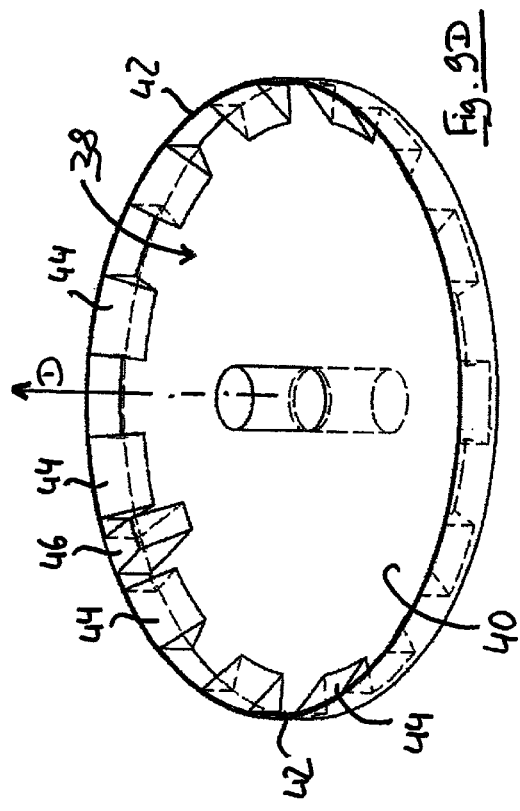
FIG. 9D shows the reflector of the embodiment of FIGS. 9A to 9C in a perspective plan view.
Figure 9C:
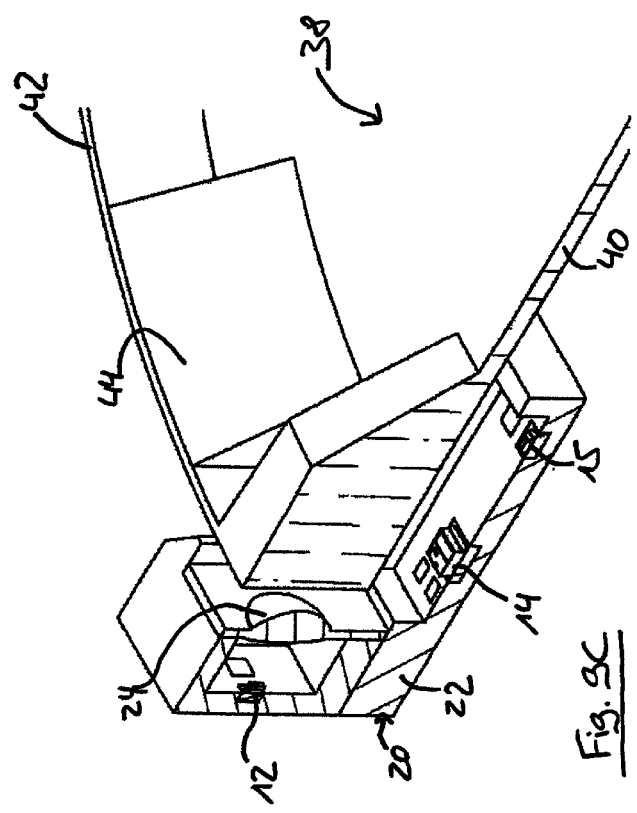

FIGS. 9A to 9C show a cross-sectional view (FIG. 9A) and two perspective views (FIGS. 9B and 9C) of a section of a further embodiment of an optical encoder 10 in which the beam deflection is based on total reflection. The arrangement of the emitter 12, first receiver 14 and second receiver 15 corresponds to that of the embodiment of FIG. 1A or FIG. 6A (the emission axis S extends in parallel with the plane of movement of the code carrier 18, that is in the horizontal direction). FIG. 9D furthermore shows the reflector 38 of the embodiment of FIGS. 9A to 9C. The reflector 38 is configured as a substantially circular disk-shaped plate 40 from which a ring 42 composed of a transparent material projects peripherally at its outer margin. A plurality of prisms 44 are arranged at regular intervals at the inner side of the ring 42; they are likewise formed from a transparent material and are each connected in a form-fitted manner to an inner side of the ring 42.

The sequence of uniform prisms 44 now forms a sequence of reflection sections, wherein electromagnetic radiation is totally reflected at chamfered surfaces of the prisms 44 facing the axis of rotation D. The sequence of prisms 44 or reflection sections in this embodiment also simultaneously serves as a sequence of code sections having a comparatively low resolution, i.e. the code carrier is integrated in the configuration of the reflector 38. In the embodiment shown, the reflector 38 has a further sequence of reflection sections that is formed by a single prism 46. The prism 46 is configured such that only a total reflection at the prism 46 results in an impingement on the second receiver 15 by electromagnetic radiation.

An axial installation of the code carrier or of the reflector 32, 38 with the code carrier is also possible in the embodiments in accordance with FIGS. 6, 7, 8 and 9 (i.e. an installation along the axis of rotation).

Figure 10A:
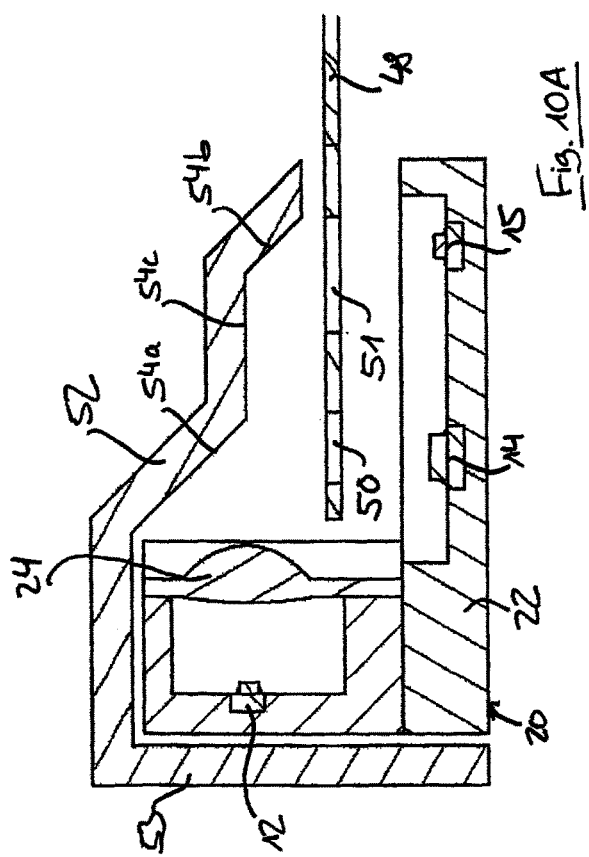
FIGS. 10A to 10C show a cross-sectional view (10A) and two perspective views (10B and 10C) of a section of a further embodiment of the optical encoder.
Figure 10B:
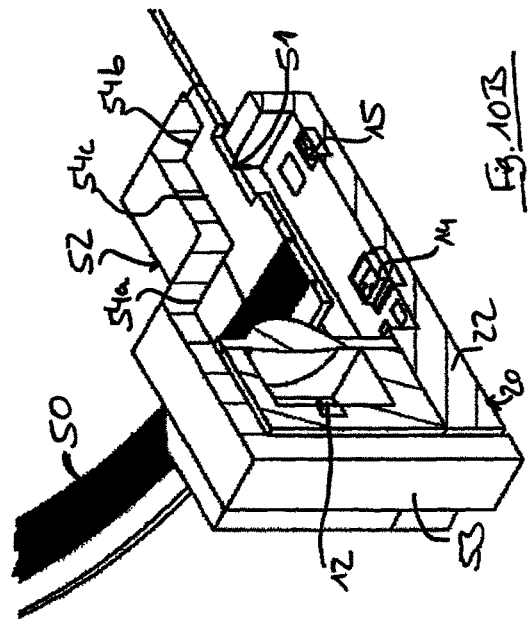
Figure 10D:
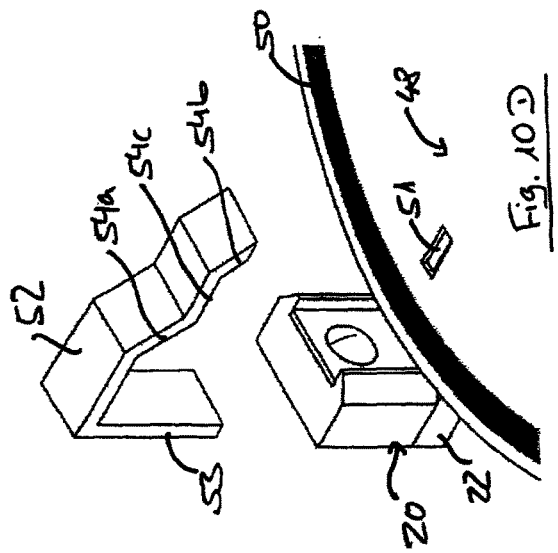
FIG. 10D shows a possible installation step of the reflector of the embodiment of FIGS. 10A to 10C.
Figure 10C:
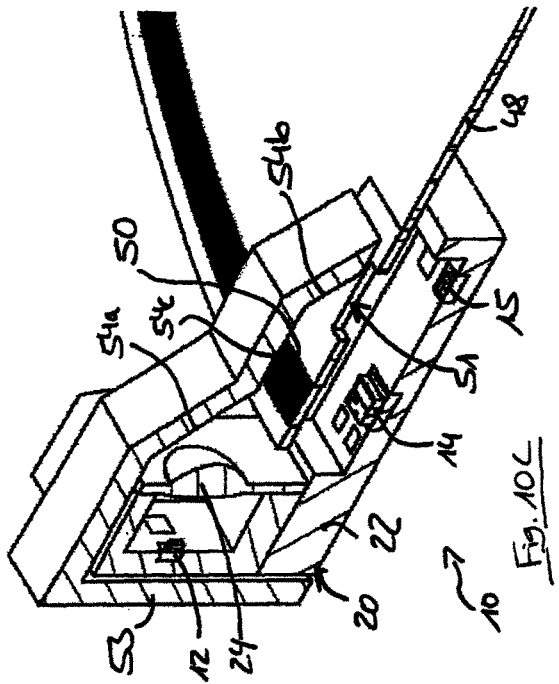

FIGS. 10A to 10C show a cross-sectional view (FIG. 10A) and two perspective views (FIGS. 10B and 10C) of a section of a further embodiment of the optical encoder 10 in accordance with the invention. The arrangement of the emitter 12, first receiver 14 and second receiver 15 in the emission and reception apparatus 20 corresponds to the arrangement of the embodiments shown in FIG. 1A and FIGS. 2A to 2D, for example. In contrast, in the embodiment of FIGS. 10A and 10B, the code carrier and reflector are no longer combined in an assembly, but rather form a separate assembly.

Similar to in the embodiment of FIGS. 1A and 2, the code carrier 48 is configured as a thin code disk that has a circular outline, that is rotatably supported about an axis of rotation, not shown, and that is oriented substantially perpendicular to the reception axis E of the receiver 14. The code carrier 48 has a sequence of code sections 50 that can, for example, again be configured as elongated slits that extend in the radial direction of the code carrier 48 and that can be formed by milling, punching, or laser cutting, for example. In addition to the sequence of code sections 50, the code carrier 48 has a second sequence of code sections 51 that is radially offset from the sequence of code sections 50. In the embodiment shown, the second sequence of code sections 51 comprises a single radiation-transmitting code element 51 in the form of a recess that gives way for the second receiver 15 to be impinged by electromagnetic radiation.

In contrast, the reflector 52 is configured as an immovable separate assembly which is held in a position above the code carrier 48 by means of a holder 53. The reflector 52 has two reflection sections 54a, 54b that are obliquely inclined with respect to the axis of rotation of the code carrier 48 and that reflect electromagnetic radiation emitted along the emission axis S in the direction of the reception axes E and E' of the first and second receivers 14 and 15.

The obliquely inclined reflection sections 54a, 54b are arranged axially and radially offset from one another with respect to the axis of rotation of the code carrier 48 and are connected to one another by a connection section 54c, formed horizontally here. Thus, the lower reflection section 54b has a radial offset in the direction of the axis of rotation D relative to the upper reflection section 54a. Furthermore, the reflection sections 54a and 54b have identical alignment angles relative to the emission axis S. Said alignment angles can, however, also have different values in other embodiments.

The reflector 52 can, for example, comprise an opaque plastic and can have a reflective coating at the reflection sections 54a and 54b. It is also conceivable that (with an adapted shape) the reflector 52 is produced from a transparent plastic and the electromagnetic radiation emitted by the emitter 12 is totally reflected in the direction of the code carrier 48 and of the first and second receivers 14 and 15. In the embodiment shown, the reflector 52 is configured as part of the emission and reception apparatus 20 of the optical encoder 10. However, the reflector 52 can also be present as a separate assembly and can be immovably installed independently of the emission and reception apparatus 20. FIG. 10D illustrates in a perspective view that the reflector 52 can also only be installed at a point in time at which the emission and reception apparatus 20 and the code carrier 48 have already been installed.

Alternatively, the code carrier 48 can, as already explained, have a peripheral cutaway to enable an axial installation along its axis of rotation.

Due to an inverted installation of the emission and reception apparatus 20 and the therewith associated exchange of the positions of the emitter 12, on the one hand, and of the first and second receivers 14, 15, on the other hand, the embodiment of FIGS. 10A to 10D can also be implemented in an orientation in which the emission axis S (as shown in FIG. 2B) is oriented perpendicular to the plane of extent or plane of movement of the code carrier 48.

Differing from the embodiments explained above, a plurality of emitters 12 can also be provided, in particular a separate emitter 12 for each sequence of code sections 26 and/or a separate emitter 12 for each receiver 14, 15. Each of the separate emitters 12 can have its own collimator 24 or a common collimator 24 can be provided.

The embodiments explained above illustrate an alignment angle between the emission axis S and the reception axis E, E' that has a value of 90 degrees. A simple design hereby results. However, depending on the application and the installation environment, other values of the alignment angle between the emission axis S and the reception axis E, E' can also be provided, in particular larger values (e.g. 120 degrees or 150 degrees) to enable a flatter arrangement of the emitter 12 and the receivers 14, 15 or smaller values (e.g. 60 degrees or 30 degrees) to enable a closer mutually adjacent arrangement of the emitter 12 and the receivers 14, 15. The alignment of the respective reflector 16, 32, 38, 52 has to be correspondingly adapted (in the case of a specular reflector, in particular to half the alignment angle between the emission axis S and the reception axis E, E').

REFERENCE NUMERAL LIST

10 optical encoder
12 emitter
14 receiver
15 second receiver
16 reflector
18 code carrier
20 emission and reception apparatus
22 carrier component
24 collimator
26 code section
27 code section
28 main plane of extent
30a reflection section
30b reflection section
30c connection section
31 reflection section
32 reflector with code carrier
34 reflection section or reflective code section
35 interruption section
36 reflection section
38 reflector
40 circular disk-shaped plate
42 transparent ring
44 prism
46 prism
48 code carrier
50 code section
51 code section
52 reflector
53 holder
54a reflection section
54b reflection section
54c connection section
56 reception element
S emission axis
E, E' reception axis
D axis of rotation

The invention claimed is:

1. An optical encoder comprising:
an emitter;
a receiver;
a reflector; and
a code carrier,
wherein the emitter emits electromagnetic radiation along an emission axis in a direction of the reflector;
wherein the reflector has at least one reflection section that deflects the electromagnetic radiation along a reception axis in a direction of the receiver;
wherein the code carrier is movably supported and has a sequence of code sections to interrupt the emitted electromagnetic radiation or to give way for the emitted electromagnetic radiation to impinge on the receiver in dependence on a position of the code carrier;
wherein the emission axis and the reception axis extend at an alignment angle with respect to one another that has a value in a range from 30 degrees to 150 degrees;
wherein the reflector is configured as a rotatable disk that is rotatably supported about an axis of rotation, with the at least one reflection section of the reflector being arranged at a periphery of the rotatable disk that is include obliquely with respect to the axis of rotation; and
wherein the code carrier is configured as a flat code disk formed separate from the reflector and that is fixedly connected to the reflector and that extends along a normal plane to the axis of rotation, with the code carrier having at least one circular ring-shaped code track, which has the sequence of code sections, at a radial spacing from the axis of rotation, and with the sequence of code sections being alternately configured as absorbing radiation or as transmitting radiation.

2. The optical encoder according to claim 1, wherein the alignment angle between the emission axis and the reception axis E amounts to 90 degrees.

3. The optical encoder according to claim 1, wherein the at least one reflection section of the reflector is aligned obliquely to the emission axis and to the reception axis at a respective angle of 45 degrees.

4. An optical encoder comprising:
an emitter;
a receiver;
a reflector; and
a code carrier
wherein the emitter emits electromagnetic radiation along an emission axis in a direction of the reflector;
wherein the reflector has at least one reflection section that deflects the electromagnetic radiation along a reception axis in a direction of the receiver;
wherein the code carrier is movably supported and has a sequence of code sections to interrupt the emitted electromagnetic radiation or to give way for the emitted electromagnetic radiation to impinge on the receiver in dependence on a position of the code carrier;
wherein the emission axis and the reception axis extend at an alignment angle with respect to one another that has a value in a range from 30 degrees to 150 degrees; and
wherein at least one interruption section of the reflector, which is arranged adjacent to the at least one reflection section and which interrupts the emitted electromagnetic radiation, forms an additional code section.

5. The optical encoder according to claim 4, wherein the reflector and the code carrier are formed by a common assembly.

6. The optical encoder according to claim 5, wherein the reflector is movable.

7. The optical encoder according to claim 5, wherein the reflector is configured as a rotatable disk, with the at least one reflection section being arranged at an obliquely inclined periphery of the rotatable disk.

8. The optical encoder according to claim 5, wherein the at least one reflection section of the reflector is formed separately from the sequence of code sections, with the sequence of code sections being alternately configured as absorbing radiation or as transmitting radiation.

9. The optical encoder according to claim 8, wherein the sequence of code sections is arranged at the code carrier such that the electromagnetic radiation is incident onto the sequence of code sections in a perpendicular or substantially perpendicular manner.

10. An optical encoder comprising: an emitter;
a receiver;
a reflector; and
a code carrier,
wherein the emitter emits electromagnetic radiation along an emission axis in a direction of the reflector;
wherein the reflector has at least one reflection section that deflects the electromagnetic radiation along a reception axis in a direction of the receiver;
wherein the code carrier is movably supported and has a sequence of code sections to interrupt the emitted electromagnetic radiation or to give way for the emitted electromagnetic radiation to impinge on the receiver in dependence on a position of the code carrier;
wherein the emission axis and the reception axis extend at an alignment angle with respect to one another that has a value in a range from 30 degrees to 150 degrees; and
wherein the reflector and the code carrier are formed by separate assemblies.

11. The optical encoder according to claim 10, wherein the reflector is immovably arranged.

12. An optical encoder comprising:
an emitter;
a receiver;
a reflector; and
a code carrier,
wherein the emitter emits electromagnetic radiation along an emission axis in a direction of the reflector;
wherein the reflector has at least one reflection section that deflects the electromagnetic radiation along a reception axis in a direction of the receiver;
wherein the code carrier is movably supported and has a sequence of code sections to interrupt the emitted electromagnetic radiation or to give way for the emitted electromagnetic radiation to impinge on the receiver in dependence on a position of the code carrier;
wherein the emission axis and the reception axis extend at an alignment angle with respect to one another that has a value in a range from 30 degrees to 150 degrees; and
wherein the code carrier has a plurality of sequences of code sections, with the plurality of sequences forming a plurality of code tracks disposed next to one another.

* * * * *